United States Patent [19]
Irifune et al.

[11] Patent Number: 6,121,168
[45] Date of Patent: Sep. 19, 2000

[54] WET TYPE PAPER FRICTION MATERIAL WITH COMBINED IMPROVED FRICTION CHARACTERISTICS AND COMPRESSION FATIGUE STRENGTH

[75] Inventors: Maki Irifune; Tetsuya Ishitani; Takao Shibuya, all of Hokkaido; Makoto Maeda, Zama; Nobutaka Chiba, Fujisawa; Yasuhiro Murakami, Yokohama, all of Japan

[73] Assignees: Dynax Corporation, Chitose; Nissan Motor Co., Ltd., Yokohama, both of Japan

[21] Appl. No.: 09/346,647

[22] Filed: Jul. 1, 1999

[30] Foreign Application Priority Data

Jul. 13, 1998 [JP] Japan .................................. 10-212026

[51] Int. Cl.$^7$ ..................................... B32B 27/02
[52] U.S. Cl. .......................... 442/169; 442/101; 442/148; 442/156; 442/161; 442/361; 428/361
[58] Field of Search .................................... 442/101, 148, 442/156, 161, 169; 428/361

[56] References Cited

U.S. PATENT DOCUMENTS

| | | |
|---|---|---|
| 4,384,640 | 5/1983 | Trainor et al. ..................... 192/107 M |
| 4,950,530 | 8/1990 | Shibatani ................................... 442/60 |
| 5,083,650 | 1/1992 | Seiz et al. ................................ 492/107 |
| 5,676,577 | 10/1997 | Lam et al. ................................ 442/60 |
| 5,707,905 | 1/1998 | Lam et al. ............................... 442/101 |
| 5,753,356 | 5/1998 | Lam et al. ............................... 442/334 |
| 5,775,468 | 7/1998 | Lam et al. .......................... 188/251 A |
| 5,825,244 | 10/1998 | Somayajula ............................. 330/253 |
| 5,827,610 | 10/1998 | Ramachandran ....................... 428/361 |
| 5,858,883 | 1/1999 | Lam et al. ............................... 442/101 |
| 5,989,375 | 11/1999 | Bortz ...................................... 156/148 |

*Primary Examiner*—Elizabeth M. Cole
*Assistant Examiner*—Arti Singh
*Attorney, Agent, or Firm*—Howson & Howson

[57] ABSTRACT

A wet paper friction material, mainly used for a slip lock-up of an automatic transmission, obtained by impregnating a paper material with a thermosetting resin, thermosetting, and molding under pressure, to attain compatibility between a good frictional characteristic and good fatigue strength under compression, wherein the paper material, in addition to a cellulose pulp and a filler, contains 30 to 80 wt % of aramid pulp with its drainability being adjusted to 250 to 440 ml in a total amount of pulp, and further contains, as a friction modifier, diatomaceous earth cylindrically formed so as to be net-like in the cylinder part and having its mean length 4 to 6 μm.

2 Claims, 8 Drawing Sheets

WET TYPE PAPER FRICTION MATERIAL WITH COMBINED IMPROVED FRICTION CHARACTERISTICS AND COMPRESSION FATIGUE STRENGTH

FIELD OF THE INVENTION

This invention relates to a wet type paper friction material mainly used for slip locking-up of an automatic transmission on a vehicle.

BACKGROUND ART

Wet type paper friction material is manufactured such that fibrous base materials such as pulp and mixture materials such as friction modifiers are dispersed in water, and then formed into paper, and after its drying operation, the formed paper is impregnated with a thermosetting resin, thermoset, and molded under pressure. Since the function of the wet type paper friction material is influenced through blending of fibrous base materials, fillers and friction modifiers mainly acting as major constituents of such paper as above, improvement in selection about raw materials and contents of raw materials has been continued in compliance with application of the wet type paper friction material.

It has been known that the fibrous constituent has an important role to apply influence over porous characteristic and flexibility of the friction material and also apply a frictional characteristic and a strength and that the friction modifiers may also influence against the porous characteristic and a surface shape of it.

In the case that a so-called slip lock-up control is carried out at a slip lock-up mechanism for an automatic transmission for transferring a driving force while a rotational difference is being produced between the wet type paper friction material and its mating surface, it is required that a variation in coefficient of friction against a variation in sliding speed within a range of low speed ($\mu$–v characteristic), a so-called "frictional characteristic" shows a positive relation over the entire range of speed to be controlled in slipping operation in order to prevent a frictional vibration called as a shudder from being produced. This $\mu$–v characteristic is influenced in particular by flexibility of the frictional material or surface shape thereof. In general, as strength of the wet type paper frictional material is increased, its flexibility is deteriorated, an alignment with the mating surface is also deteriorated and then its frictional characteristic is deteriorated. In turn, in order to improve an alignment with the mating surface, application of flexibility to the wet type paper frictional material caused the frictional characteristic to be improved, although its fatigue strength under compression was decreased and both superior frictional characteristics and fatigue strength under compression could not be accomplished concurrently.

DISCLOSURE OF THE INVENTION

The present invention has been completed in reference to the aforesaid circumstances to attain a wet type paper friction material in which the superior frictional characteristics and the fatigue strength under compression can be accomplished concurrently by improving the composition of the prior art wet type friction material in reference to pulp forming a paper or diatomaceous earth contained in the friction modifier.

The present invention provides a wet type paper friction material which can be attained by impregnating the paper member with a thermosetting resin, thermosetting it and further molding it under pressure. The wet type paper friction material is characterized in that the paper member contains aramid pulp of which drainability is adjusted to 250 to 440 ml by 30 to 80 wt % of a total amount of pulp in addition to the cellulose pulp and fillers. Further, as a friction modifier, it contains diatomaceous earth of which the cylinder part is a net-like structure with its mean length being 4 to 6 $\mu$m.

Aramid pulp constituting the aforesaid paper is adjusted to have "drainability" of about 250 to 440 ml. The term "drainability" herein defined is meant by an index (numerical value) to indicate a degree of being drainable of the pulp and to indicate a degree of having been stricken of the fiber. A testing method for "drainablity of pulp" is defined in JIS P8121 and this method can be classified into "Canadian Standards Drainablity Testing Method" and "Schopper Drainablity Testing Method". In the present invention, the "Canadian Standards Drainablity Testing Method" is employed.

DETAILED DESCRIPTION OF THE INVENTION

Figure 1:
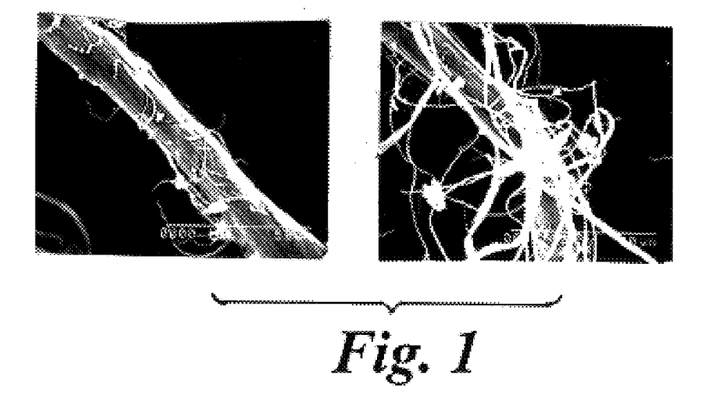
FIG. 1 is an SEM photograph in which two kinds of aramid pulps having different drainability are compared from each other.

As indicated in the photograph in FIG. 1, the smaller a drainability, the more a decomposition of the fiber and then a degree of branching of each of fibers is increased. As the degree of branching of the aramid pulp is increased, a filtering time when the paper is manufactured can be adjusted, resulting in that a paper having less amount of surface corrugations can be attained. Entangling of fibers acting as main frame of paper is increased, resulting in that a contact area with the mating surface at the surface of the frictional material is increased, and thus a superior frictional characteristic can be attained.

Figure 2:
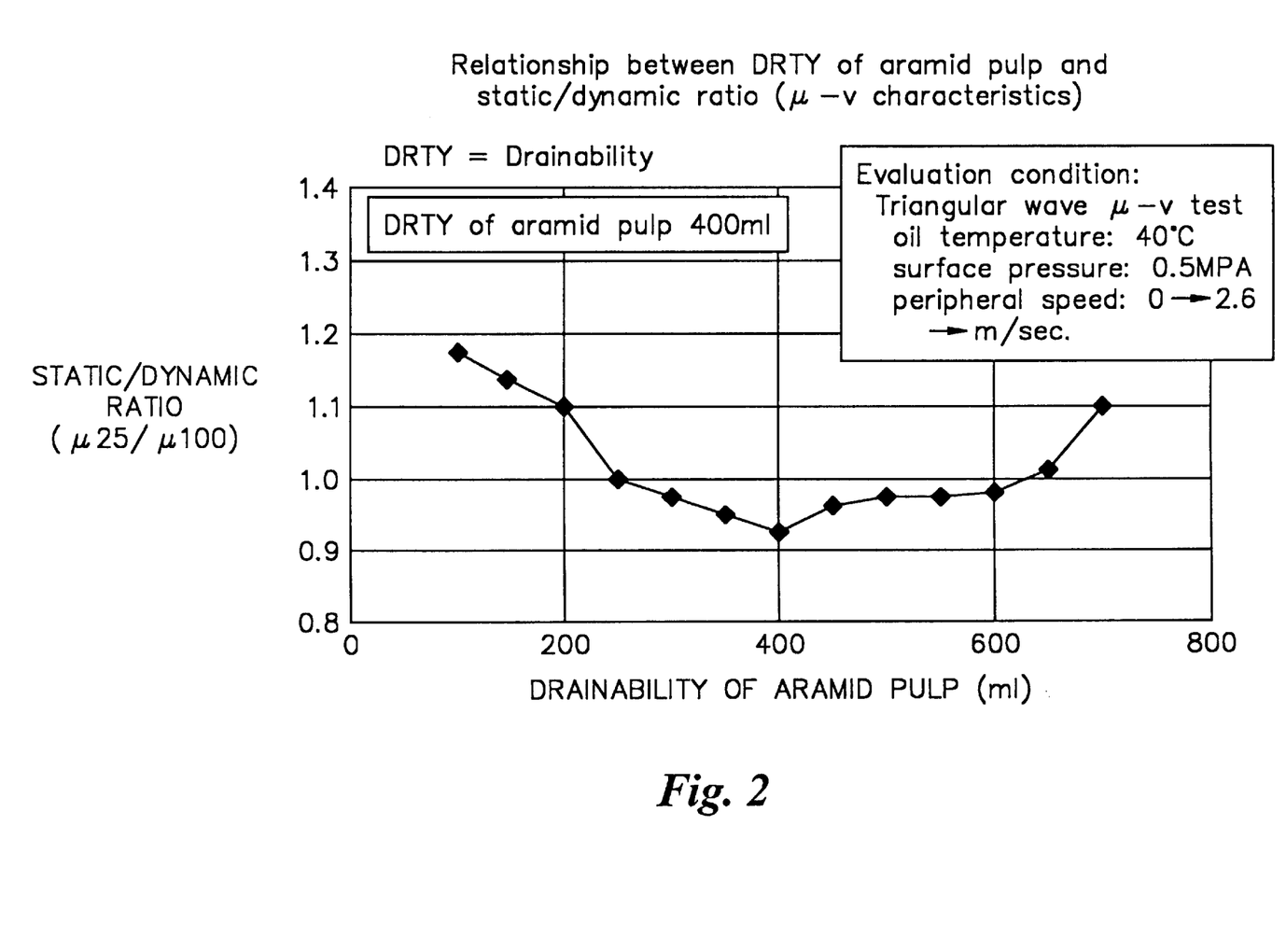
FIG. 2 is a relational diagram for showing a relation between a drainability of aramid pulp and a static/dynamic ratio.

As apparent from FIG. 2, aramid pulp constituting this paper material with a drainability of lower than 250 ml, owing to its much branching fibrous, causes much amount of resin to be adhered to many crossing points of fibers.

Consequently, a requisite flexibility required in the wet type paper friction material can not be attained, a poor contact with the mating surface is produced and a superior frictional characteristic can not be attained.

Similarly, as apparent from FIG. 2, if pulp having a drainability of higher than 440 ml is used as aramid pulp constituting this paper material, a filtering time during the paper making operation is made fast, resulting in that a certain corrugation may easily be formed at the surface of the paper material. Therefore, formation of the surface of the wet paper friction material is made poor, its abutment against the mating surface is deteriorated and a superior frictional characteristic may not be attained.

Figure 3:
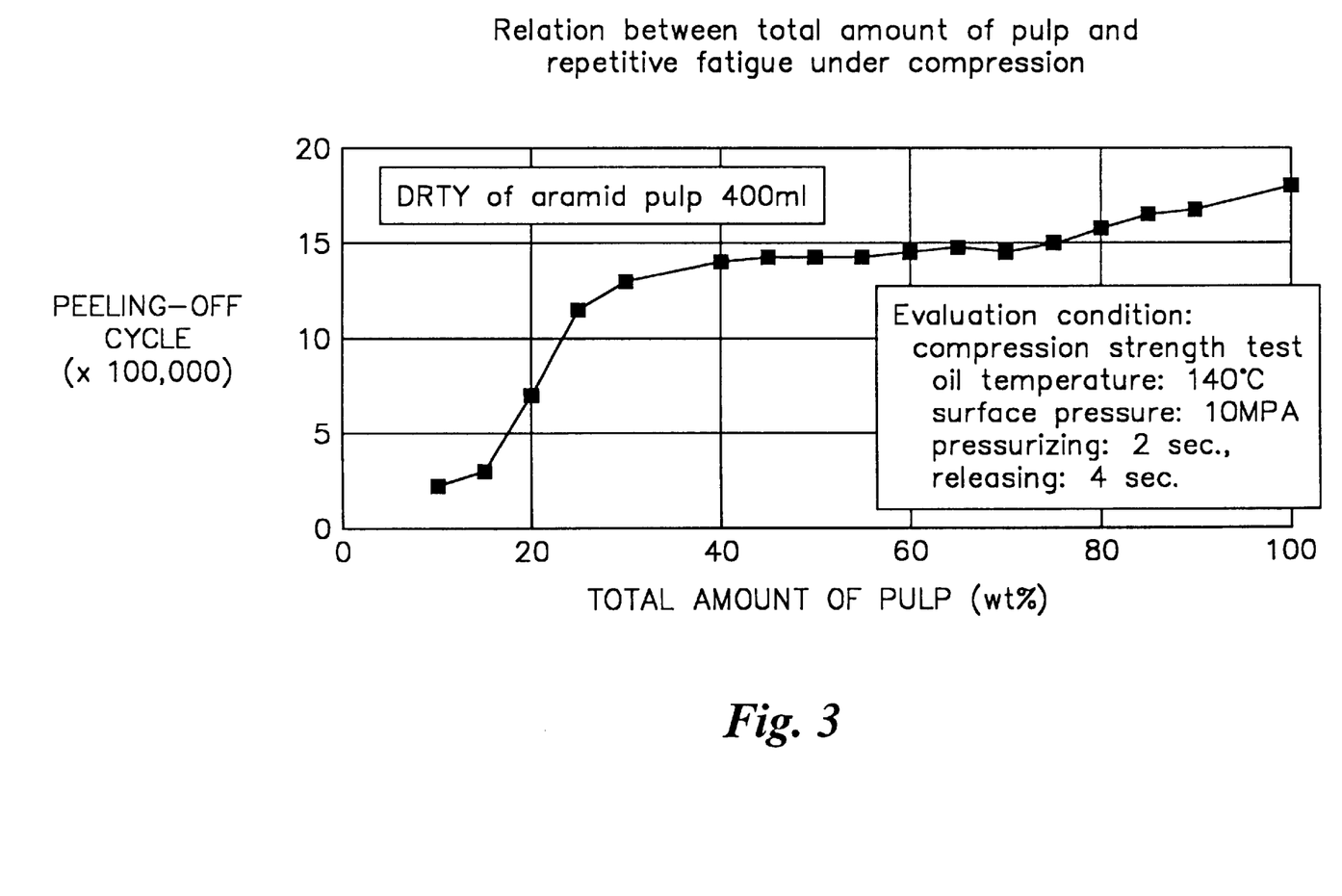
FIG. 3 is a relational diagram for showing a relation between a total amount of pulp and a repetitive compression strength.

Then, as apparent from FIG. 3, when a total amount of pulp constituting this paper material becomes smaller than 30 wt % in respect to the paper material, a porous structure of the paper material formed by fiber having pulp as its major constituent shows a possibility that the fibrous portion has a fatigue and is easily broken under repetitive application of load, resulting in that the wet paper friction material is in danger of being peeled off during its use.

Figure 4:
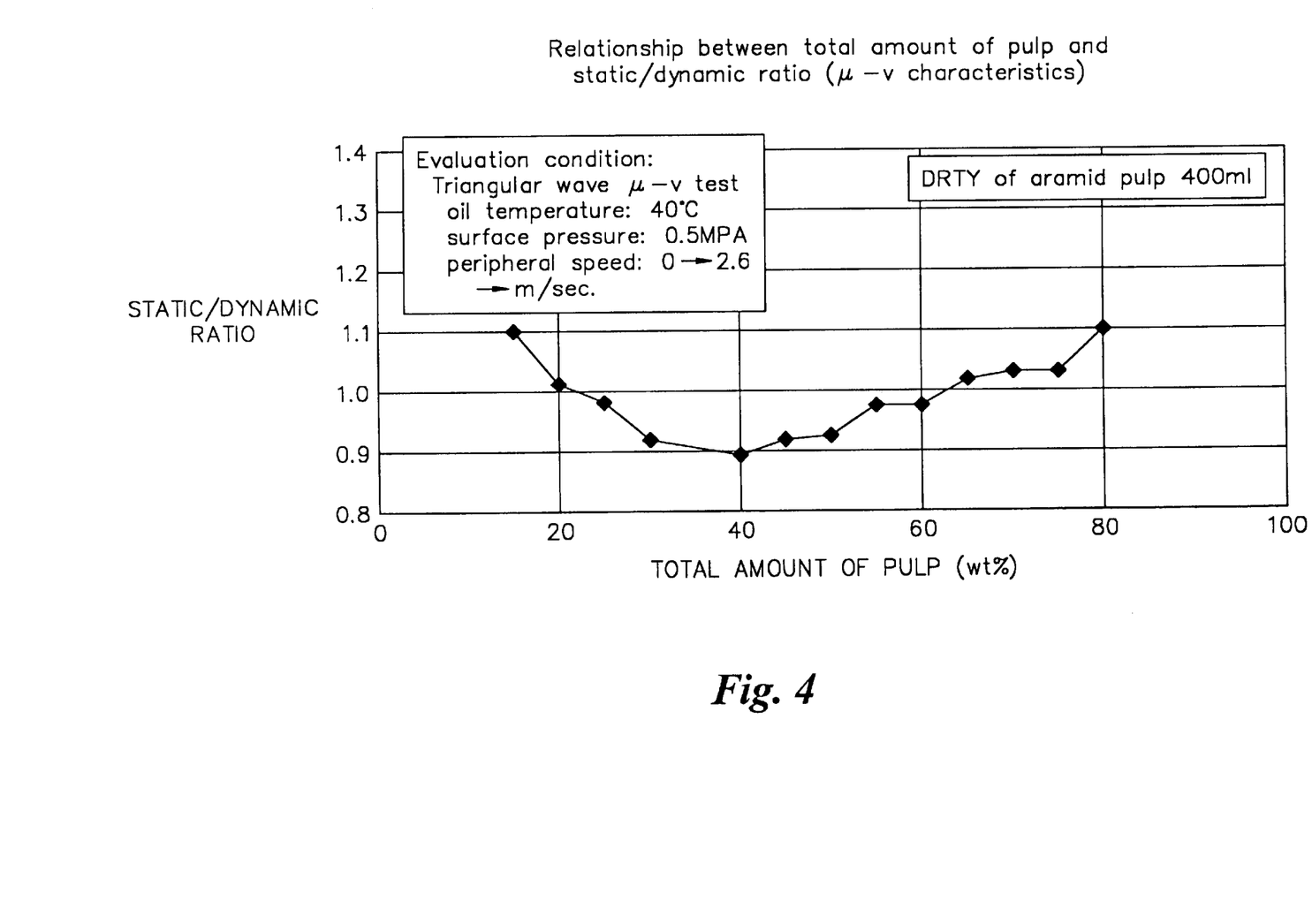
FIG. 4 is a relational diagram for showing a relation between a total amount of pulp and a static/dynamic ratio.

In addition, as apparent from FIG. 4, when a total amount of pulp constituting this paper material is increased to be larger than 60 wt % in respect to the paper material, a density of fiber is increased, a flexibility of the wet paper friction material is damaged, a contact against the mating surface is deteriorated and a superior frictional characteristic may not be attained.

Figure 5:
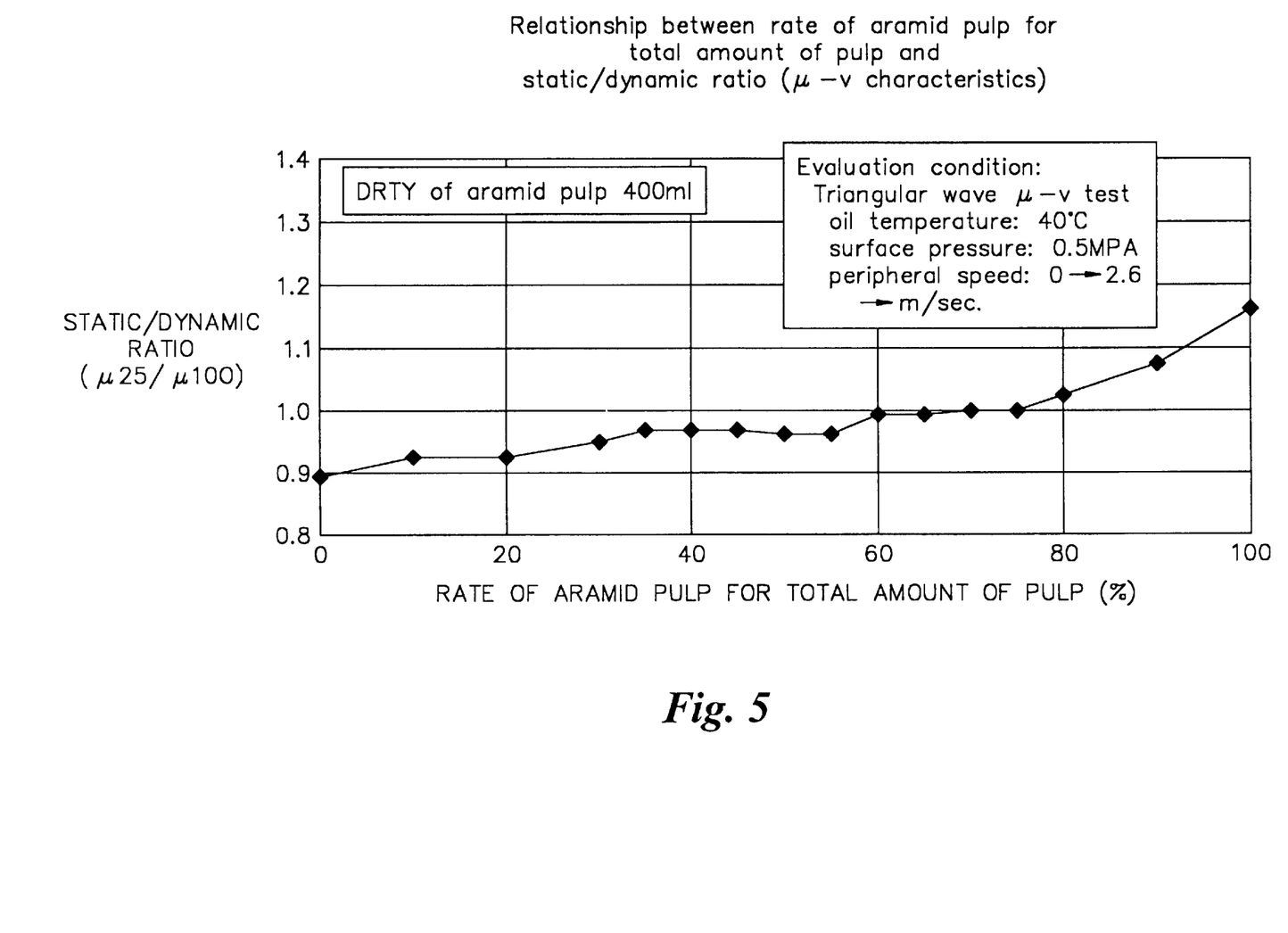
FIG. 5 is a relational daigram for showing a rate of aramid pulp occupying against a total amount of pulp and a static/dynamic ratio.

Then, as shown in FIG. 5, when a rate of aramid pulp of which drainability is adjusted in respect to a total amount of pulp constituting the paper material is increased to be larger than 80 wt %, a smoothness of the paper material is deteriorated due to the fact that the aramid pulp in an original pill form shows a hard dispersion of individual fibers when the paper is made, resulting in that a smoothness of the paper material is deteriorated and a superior frictional characteristic can not be attained.

Figure 6:
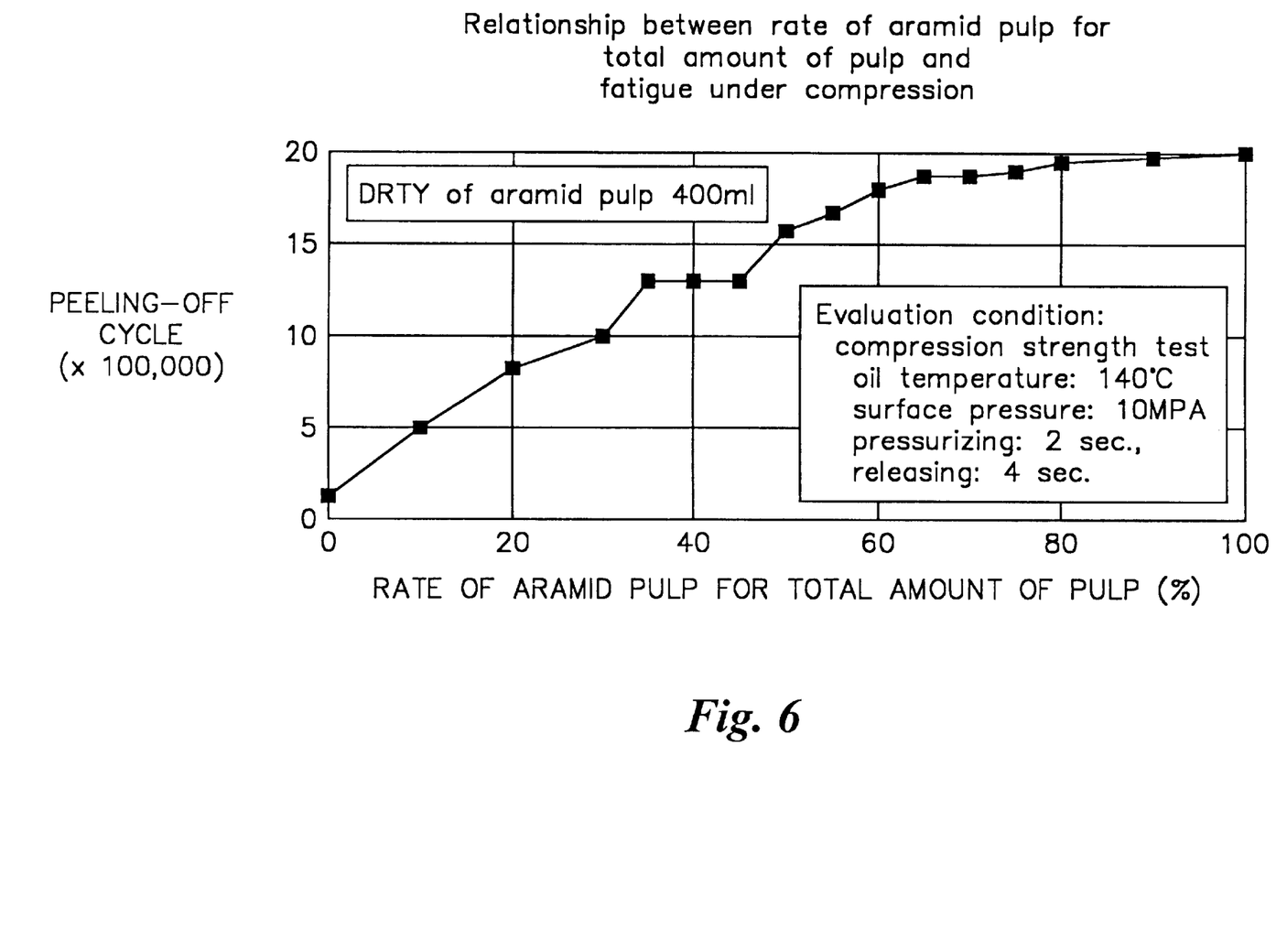
FIG. 6 is a relational diagram for showing a rate of aramid pulp occupying against a total amount of pulp and a fatigue strength under compression.

Further, as shown in FIG. 6, when a rate of aramid pulp of which drainability is adjusted in respect to a total amount of pulp constituting the paper material is decreased to be smaller than 30 wt %, cellulose which is inferior in the repetitive fatigue strength under compression is relatively increased, resulting in that the pulp is peeled off.

Figure 7:
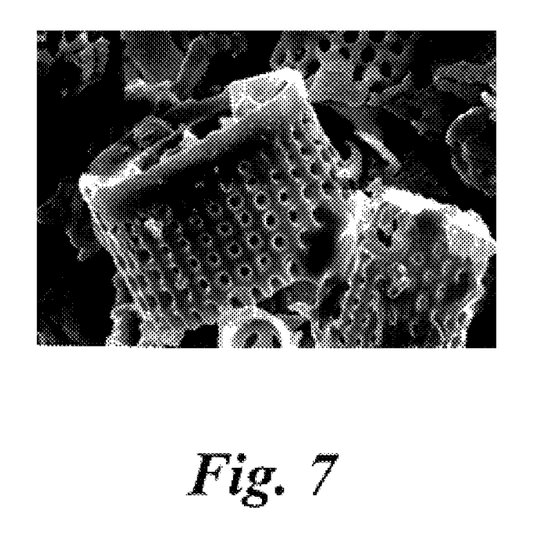
FIG. 7 is a microscopic photograph for showing cylindrical diatomaceous earth particles.
Figure 8:
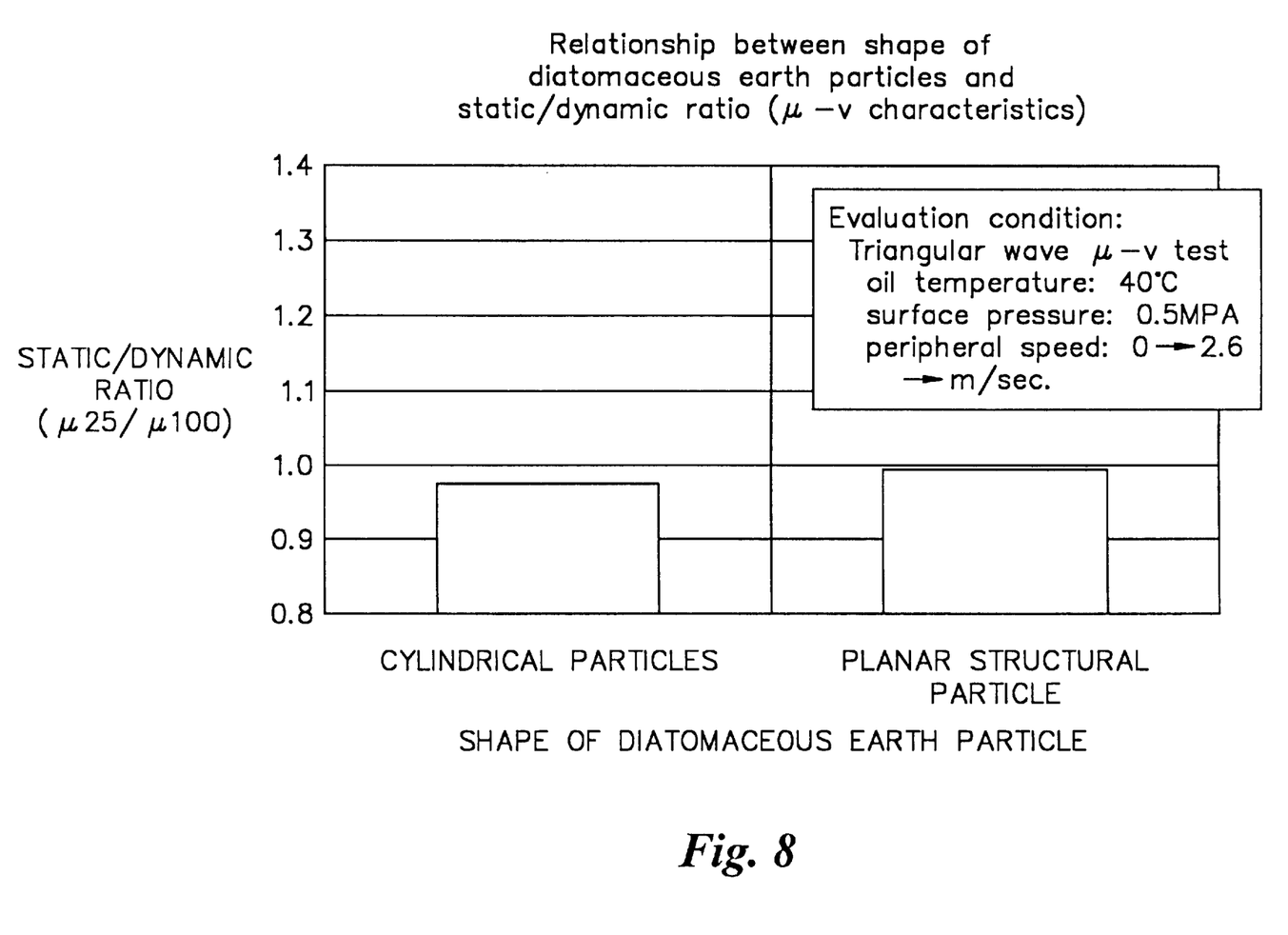
FIG. 8 is a relational diagram for showing a relation between a shape of diatomaceous earth particle and a static/dynamic ratio.

Diatomaceous earth blended in this paper material has a cylindrical shape as shown in the photograph of FIG. 7, wherein the cylindrical part has a net-like structure. Since the diatomaceous earth has some vacant pores within the particles as compared with that of usual diatomaceous earth showing a planar structure, a more fast and uniform immersion of oil into the wet paper friction material and a lubricating state at the frictional interface becomes more uniform and a superior frictional characteristic can be attained. This fact also becomes apparent in reference to FIG. 8.

Figure 9:
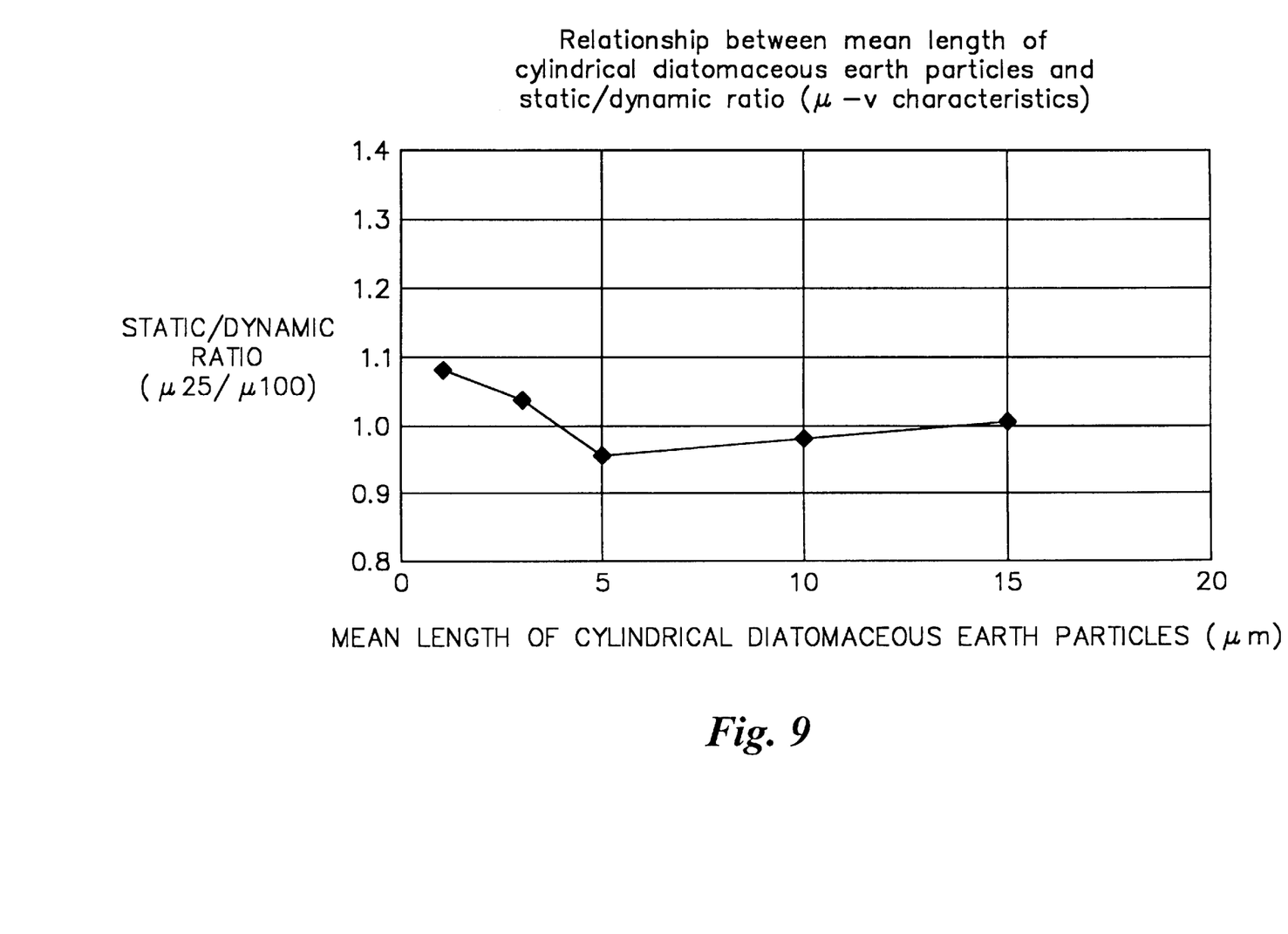
FIG. 9 is a relational diagram for showing a relation between a mean length of diatomaceous earth particle and a static/dynamic ratio.

In addition, as shown in FIG. 9, if a mean length of this cylindrical diatomaceous earth is shorter than 41 $\mu$m, immersion of oil into the wet paper friction material is deteriorated, a frictional characteristic is also deteriorated and if a mean length of the cylindrical diatomaceous earth is longer than 6 $\mu$m, the surface of wet friction material is made rough and its frictional characteristic is deteriorated.

In addition, friction modifiers of 40 to 70 wt % is blended in this paper material. As the friction modifiers, various kinds of graphite powder particles, activated carbons and inorganic fibers and the like may be included in addition to the aforesaid diatomaceous earth.

Further, the paper material is impregnated with a thermosetting resin in such a way that its content may become 20 to 40 wt %, thermoset, and molded under pressure. As the aforesaid thermosetting resin, phenol resin of resol-system is preferably employed.

EXAMPLES

Referring now to the Examples, the present invention will be described more practically as follows:

Example 1

The paper material of mixture was impregnated with a thermosetting resin up to 30 wt %, blending with 20 wt % of cellulose pulp, 25 wt % of aramid pulp with its drainability being adjusted to 370 ml, and 55 wt % of a friction modifier containing diatomaceous earth comprised of cylindrical particles. Then, after being thermoset and molded under pressure, it was bonded to the core of a steel plate utilizing a thermosetting resin to make a wet type clutch plate.

Example 2

The paper material of mixture was impregnated with a thermosetting resin up to 30 wt %, blending with 21 wt % of cellulose pulp, 9 wt % of aramid pulp with its drainablity being adjusted to 370 ml and 70 wt % of a friction modifier containing diatomaceous earth comprised of cylindrical particles. Then, after being thermoset and molded under pressure, it was bonded to the core of a steel plate utilizing a thermosetting resin to make a wet type clutch plate.

Example 3

The paper material of mixture was impreganted with a thermosetting resin to 30 wt %, blending with 12 wt % of cellulose pulp, 48 wt % of aramid pulp with its drainability being adjusted to 370 ml and 40 wt % of a friction modifier containing diatomaceous earth comprised of cylindrical particles. Then, after being thermoset and molded under pressure, it was bonded to the core of a steel plate utilizing a thermosetting resin to make a wet type clutch plate.

Evaluations on both the frictional characteristic and fatigue strength under compression were carried out by the testing methods described below in reference to the wet type friction clutch plates attained in this way. ≪ Condition of frictional characteristic evaluation≫

Testing Machine: Low Speed Slipping Friction Testing Machine (triangular wave $\mu$–v test)

Performance Attaining Condition:

Friction Surface: One surface

Oil Surface: 120° C., 40° C.

Surface Pressure: 0.5 MPa, 1.5 MPa

Peripheral Speed: 0 2.6 m/sec→0

As a result of performing the aforesaid tests, the wet type paper materials in the Examples Nos. 1, 2 and 3 showed a change in a coefficient of friction with a positive gradient in respect to a change in sliding speed, which was a good result. ≪ Condition of fatigue strength under compression evaluation≫

Oil Temperature: 140° C.

Surface Pressure : 10 MPa

Cycle: 1 second of pressurizing and 1 second of releasing are applied as one cycle.

As a result, all the wet type paper friction materials of each of the Examples showed sufficient strength.

Examples of Comparison

As per the examples of comparison Nos. 1 to 7, evaluations similar to those of the above-mentioned Examples were carried out. Their results are indicated in Table 1.

TABLE 1

Compositions of Friction Material in both Examples and Comparison Examples, and Comparison of Results of Evaluation

| | Example 1 | Example 2 | Example 3 | Comparison Example 1 | Comparison Example 2 | Comparison Example 3 | Comparison Example 4 | Comparison Example 5 | Comparison Example 6 | Comparison Example 7 |
|---|---|---|---|---|---|---|---|---|---|---|
| Aramid pulp Drain 'ty (ml) | 370 | ← | ← | *200* | *680* | 370 | ← | ← | ← | ← |
| Aramid pulp (wt %) | 25 | 9 | 48 | ← | ← | *11* | *39* | *9* | *41* | 25 |
| Cellulose pulp (wt %) | 20 | 21 | 12 | ← | ← | *9* | *31* | *36* | *4* | 20 |
| Rate of aramid pulp in a total amount of pulp (%) | 55 | 30 | 80 | 55 | 55 | 55 | 55 | *20* | *90* | 55 |
| Friction modifier (wt %) | 55 | 70 | 40 | ← | ← | *80* | *30* | 55 | ← | ← |
| Diatomaceous earth particle shape | Cylindrical shape | ← | ← | ← | ← | ← | ← | ← | ← | Planar structure |
| Thermosetting resin (wt %) | 30 | ← | ← | ← | ← | ← | ← | ← | ← | ← |
| Frictional characteristic ($\mu$-v gradient) Gradient: Positive ○ > Δ > x negative | ○ | ○ | ○ | x | x | x | x | ○ | x | Δ |
| Compression strength Peeling-off life cycle | 200,000 | 180,000 | 230,000 | 200,000 | 200,000 | 10,000 | 250,000 | 100,000 | 250,000 | 200,000 |

Note)
Italic numbers denote different points for each of the Examples

It is apparent from Table 1 that the materials showing a superior frictional characteristic are the Examples Nos. 1, 2, 3 and the comparison example No. 5 with a less rate of aramid pulp. However, the comparison example No. 5 had relatively much amount of blending of cellulose pulp, resulting in that the fatigue strength under compression was inferior.

Advantages of the Invention

As is known from the aforesaid description, the present invention may provide a wet paper friction material in which both the frictional characteristics and fatigue strength under compression can be attained concurrently by specifying a range of blending ratio of the pulp fiber in the paper material for the wet paper friction material and the kind of diatomaceous earth in the friction modifier.

What is claimed is:

1. A wet paper friction material obtained by impregnating a paper material with a thermosetting resin, thermosetting it, and molding it under pressures characterized in that:

said paper material includes pulp including cellulose pulp, 30 to 80 wt % of the total amount of pulp being an aramid pulp with its drainability adjusted to 250 to 440 ml., a filler, and, as a friction modifier, diatomaceous earth in the form of porous, cylindrical particles, the porous, cylindrical particles in the friction material having a mean length in the range of 4 to 6 $\mu$m.

2. A wet paper friction material according to claim 1, wherein said cellulose pulp and aramid pulp combined constitute 30 to 60 wt % of said paper material.

* * * * *